United States Patent
Watanabe et al.

[11] Patent Number: 6,029,911
[45] Date of Patent: Feb. 29, 2000

[54] AIR OZONE MIXER AND OZONE FOG GENERATOR

[75] Inventors: Masanori Watanabe, Kamagaya; Atsuyoshi Minobe, Kamakura; Hiroshi Dazai, Yokohama, all of Japan

[73] Assignee: Ishikawajima-Harima Jukogyo Kabushiki Kaisha, Tokyo, Japan

[21] Appl. No.: 09/147,132

[22] PCT Filed: Feb. 16, 1998

[86] PCT No.: PCT/JP98/00609

§ 371 Date: Oct. 15, 1998

§ 102(e) Date: Oct. 15, 1998

[87] PCT Pub. No.: WO98/35909

PCT Pub. Date: Aug. 20, 1998

[30] Foreign Application Priority Data

Feb. 17, 1997 [JP] Japan ................................. 9-031960

[51] Int. Cl.[7] ..................................................... B05B 7/04
[52] U.S. Cl. .................. 239/427; 239/434; 261/DIG. 42; 210/760
[58] Field of Search ................................... 239/418, 426, 239/427, 434; 261/DIG. 42, 76, 79.2; 210/760, 192, 198.1

[56] References Cited

U.S. PATENT DOCUMENTS

| | | | |
|---|---|---|---|
| 2,388,753 | 11/1945 | Mallmann et al. | 261/DIG. 42 |
| 4,007,120 | 2/1977 | Bowen | 261/DIG. 42 |
| 4,049,552 | 9/1977 | Arff | 261/DIG. 42 |
| 4,076,617 | 2/1978 | Bybel et al. | 261/DIG. 42 |
| 5,053,140 | 10/1991 | Hurst | 261/DIG. 42 |
| 5,431,861 | 7/1995 | Nagahiro et al. | 261/DIG. 42 |

FOREIGN PATENT DOCUMENTS

| | | |
|---|---|---|
| 50 12049 | 6/1948 | Japan . |
| 53-31255 | 3/1978 | Japan . |
| 56-113333 | 9/1981 | Japan . |
| 64 32866 | 2/1989 | Japan . |
| 1-215396 | 8/1989 | Japan . |
| 2-157091 | 6/1990 | Japan . |
| 3-165893 | 7/1991 | Japan . |
| 4-53437 | 5/1992 | Japan . |
| 6-170195 | 6/1994 | Japan . |
| 63-59961 | 3/1998 | Japan . |

*Primary Examiner*—Lesley D. Morris
*Attorney, Agent, or Firm*—Oblon, Spivak, McClelland, Maier & Neustadt, P.C.

[57] ABSTRACT

Provided are an air passage (17) extending from one end surface of a body (16) toward the other end of the body, a throat (18) extending from a downstream end of the air passage (17) toward the other end of the body, an elongated mixed gas passage (19) extending from a downstream end of the throat (18) to the other end of the body (16), an ozone passage (20) extending from an outer lateral surface of the body (16) toward a portion near an upstream end of the mixed gas passage (19), an ozone injection port (21) communicating from a downstream end of the ozone passage (20) to the portion near the upstream end of the mixed gas passage (19). A ratio of the cross-sectional area of the mixed gas passage (19) to that of the throat (18) is set to about 2. Thus, the air-ozone mixed flow is discharged out of the mixed gas passage (19) without substantially reducing the pressure of the mixed flow to ensure spraying pressure for atomizer nozzles.

3 Claims, 4 Drawing Sheets

AIR OZONE MIXER AND OZONE FOG GENERATOR

FIELD OF THE INVENTION

The present invention relates to an air-ozone mixer and an ozone fog generator used for deodorizing.

BACKGROUND ART

Household waste water from homes and industrial waste water from offices are collected through sewage work to waste water treatment facilities where the waste water is purified through various treatment processes and then is discharged to rivers and/or seas.

On the other hand, various deodorizers are used to suppress diffusion of offensive smell from sewage collected at the waste water treatment facilities.

FIG. 1 illustrates an example of a waste water treatment system or facility where an ozone deodorizer as disclosed in Japanese Utility Model 3002318 is applied. This waste water treatment system comprises an upwardly opened treatment vessel body 1, a cover 2 on the vessel body 1 and an exhaust pipe 4 vertically extending through the cover 2 and having an exhaust fan 3 at its intermediate portion.

The treatment vessel body 1 is buried in the ground in such manner that the cover 2 is positioned near the ground surface. Provided inside the vessel body 1 are pre-treatment, adjustment and aeration vessels 5, 6 and 7.

Sewage to be treated flows from outside into the pre-treatment vessel 5 via a screen 8 which serves to remove relatively large dust and refuse.

The sewage treated in the pre-treatment vessel 5 flows over a weir between the vessels 5 and 6 into the adjustment vessel 6 since new sewage flows from outside into the vessel 5. Likewise, the sewage treated in the adjustment vessel 6 flows over a weir between the vessels 6 and 7 into the aeration vessel 7 since new sewage flows from the pre-treatment vessel 5 into the adjustment vessel 6.

Further, the sewage, which has been purified by the various treatment processes in the vessels 5, 6 and 7 to have BOD (biochemical oxygen demand) and the like values within levels as allowable by laws, regulations and the like, is pumped from the aeration vessel 7 by a pump (not shown) and is discharged to rivers and/or seas.

The ozone deodorizer comprises a filter box 9 for removing particulates and the like in the air through filtration of the air, an oxygen generator 10 for extracting oxygen ($O_2$) by applying and reducing pressure on the air filtered through the filter box 9, an ozone generator 11 for generating ozone ($O_3$) by applying high voltage on the oxygen from the oxygen generator 10, a fan 12 for sucking and discharging the air, a discharge pipe 13 extending through the cover 2 such that its upstream and downstream portions are positioned above and below the cover 2, respectively, and a plurality of branch pipes 15 connected to the downstream portions of the discharge pipe 13 and communicated with a space 14 defined by the cover 2 and the treatment vessel body 1.

The above-mentioned filter box 9, oxygen generator 10, ozone generator 11 and fan 12 are arranged outside the treatment vessel body 1. An ozone outlet of the ozone generator 11 and an air outlet of the fan 12 are connected to the upstream portion of the discharge pipe 13.

In the waste water treatment system shown in FIG. 1, actuation of the oxygen generator 10, ozone generator 11, and fan 12 causes mixture of ozone generated by the ozone generator 11 with the air from the fan 12 to flow through the discharge pipe 13 and branch pipes 15 into the space 14 defined by the cover 2 and vessel body 1.

The ozone contained in this mixture oxidizes smell components such as hydrogen sulfide ($H_2S$) and ammonia ($NH_3$) emitted from the sewage to be treated in the vessels 5, 6 and 7 to reduce the offensive smell.

However, half-life of ozone in the atmospheric air is about 13 hours. As is disclosed in the above, reaction rate of oxidation of the smell components emitted from the sewage inside the waste water treatment system is not very high. Relatively long time is required for the reaction of ammonia with ozone so that the reaction may be carried out inefficiently within the limited time.

From these reasons, in the waste water treatment system shown in FIG. 1, the offensive smell components emitted from the sewage may not be sufficiently oxidized by ozone and may be discharged together with unreacted ozone to outside through the exhaust pipe 4, resulting in diffusion of the offensive smell outside the waste water treatment system.

Also a deodorization method has been proposed in which ozone and water are mixedly sprayed through atomizer nozzles so as to generate hydroxyl radicals (OH radicals), which have higher activity than ozone and may be used for oxidization of smell components. However, pressure of ozone flow from ozone generating means such as the ozone generator 11 is less than 1 $kg/cm^2$ and water cannot be sprayed out through the atomizer nozzles only by the ozone flow from the ozone generating means. As a result, no hydroxyl radicals are generated.

To solve the above problems, it is an object of the present invention to ensure spraying pressure at atomizer nozzles for mixedly spraying ozone and water and efficiently remove smell components.

DISCLOSURE OF THE INVENTION

In an air-ozone mixer according to the invention, a mixed gas passage through which ultrasonic flow passes is made elongated to suppress increase of pressure in the mixed gas passage near its upstream end which increase may otherwise occur due to impact waves caused by the ultrasonic flow in the mixed gas passage at its downstream portion and/or due to expansion waves of the ultrasonic flow. An ozone injection port is communicated with the mixed gas passage near its upstream end to cause ozone flow under low pressure to be mixed with compressed air flow under high pressure without being influenced by downstream air flow conditions in the mixed gas passage, and the air-ozone mixed flow is discharged out of the mixed gas passage without extensively reducing the pressure of the mixed flow.

According to an ozone fog generator of the invention, the ozone flow under low pressure from the ozone generator is mixed, in the air-ozone mixer, with the compressed air flow under high pressure from the air compressor. The air-ozone mixed flow from the air-ozone mixer and water flow from water supplying means are mixedly sprayed by the atomizer nozzles to generate hydroxyl radicals with high activity from ozone and water molecules in fine water particles.

BEST MODE FOR CARRYING OUT THE INVENTION

In the following, the invention embodied will be described with reference to the attached drawings.

Figure 1:
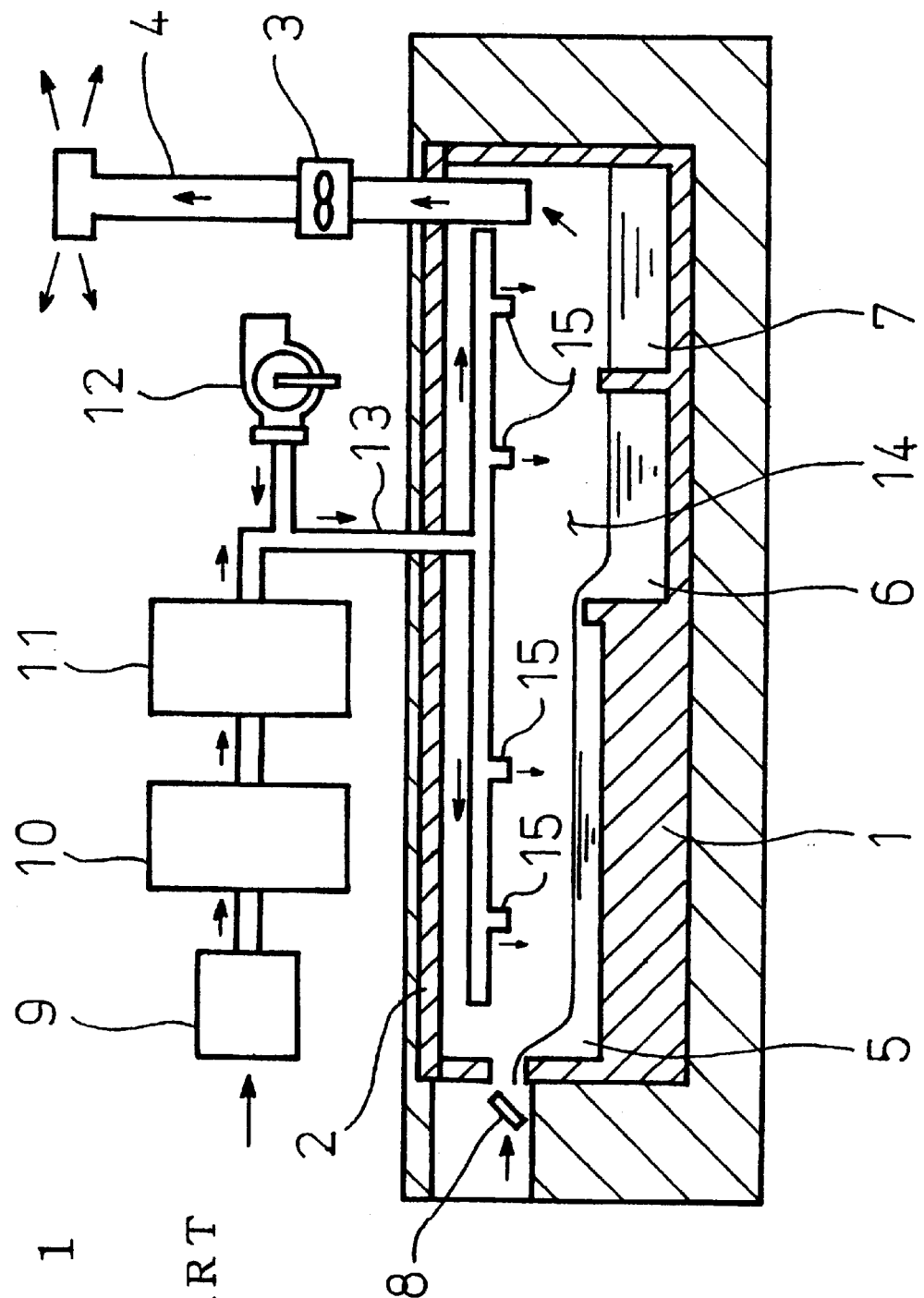
FIG. 1 is a schematic view of a waste water treatment system to which a conventional ozone deodorizer is applied.
Figure 2:
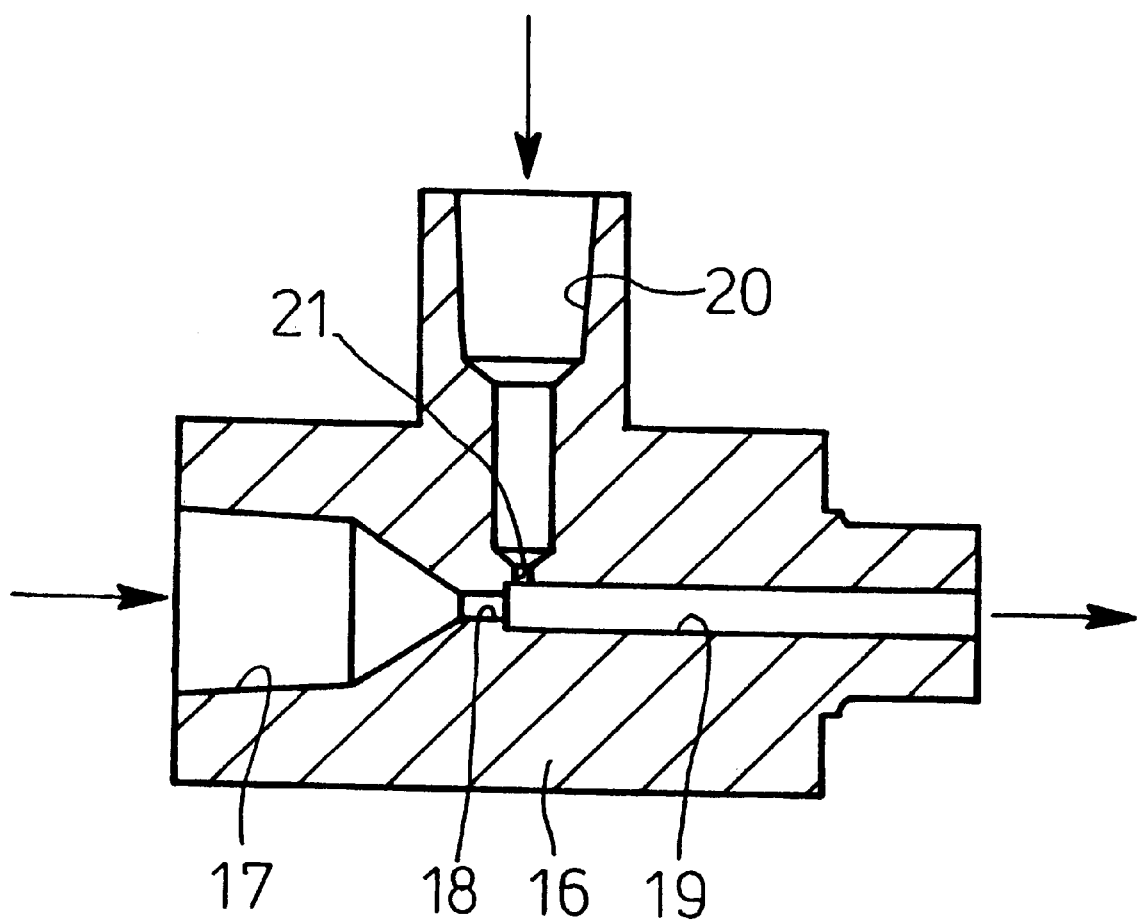
FIG. 2 is a sectional view of an embodiment of an air-ozone mixer according to the invention.

FIG. 2 shows an embodiment of an air-ozone mixer of the invention. The air-ozone mixer has a body 16 which is formed with an air passage 17 extending from one end surface toward the other end of the body and having a cross-sectional area gradually reduced in a portion closer to the downstream end, a throat 18 extending from a downstream end of the air passage 17 toward the other end of the body and having a cross-sectional area substantially equal to that of the downstream end of the air passage 17, a mixed gas passage 19 having overall length longer than the total length of the air passage 17 and throat 18, extending from a downstream end of the throat 18 to the other end of the body 16 and having a cross-sectional area slightly larger than that of the throat 18, an ozone passage 20 extending from an outer lateral surface of the body 16 toward a portion near the upstream end of the mixed gas passage 19 and having cross-sectional area reduced at the portion closer to the center of the body and an ozone injection port 21 communicating a downstream end of the ozone passage 20 with the portion near the upstream end of the mixed gas passage 19. The body 16 is manufactured by machining of metal material or by precision metal casting.

Prior to mixing of air with ozone by the air-ozone mixer shown in FIG. 2, compressed air flow under pressure of about 3 to 5 $kg/cm^2$ discharged from an air compressor is supplied to the air passage 17, and an ozone flow under pressure less than 1 $kg/cm^2$ discharged from the ozone generating means is supplied to the ozone passage 20.

The compressed air flow supplied to the air passage 17 is compressed when it enters into the throat 18, and is expanded when it passes via the throat 18 through the mixed gas passage 19. Then, it passes downstream through the mixed gas passage 19 at ultrasonic speed.

The ozone flow supplied to the ozone passage 20 is sucked to the portion near the upstream end of the mixed gas passage 19 from the ozone passage 20 via the ozone injection port 21 because of decrease of pressure due to expansion of the compressed air flow passing through the mixed air passage 19. Thus, the air-ozone mixed flow passes downstream through the mixed gas passage 19.

Thus, in the air-ozone mixer shown in FIG. 2, the mixed gas passage 19 through which ultrasonic flow passes is made elongated in comparison with commonly used Laval nozzles. Such elongation of the mixed gas passage 19 will suppress increase of pressure at the portion near the upstream end of the mixed gas passage 19, which pressure may otherwise be increased due to impact waves caused by the ultrasonic flow in the mixed gas passage 19 at its portion closer to the downstream end and/or due to expansion waves of the ultrasonic wave.

Since the ozone injection port 21 is communicated with the portion near the upstream end of the mixed gas passage 19, the compressed air flow under pressure of about 3 to 5 $kg/cm^2$ is mixed with the ozone flow under pressure less than 1 $kg/cm^2$ without being influenced by downstream air flow conditions of the mixed gas passage 19. Accordingly, the air-ozone mixed flow can be discharged from the mixed gas passage 19 to outside of the air-ozone mixer with no substantial reduction of the pressure of the mixed flow. Therefore, it is possible to ensure spray pressure of the atomizer nozzles through which ozone and water are mixedly sprayed.

Table 1 summarizes the results of measurement of various parameters: area ratio $A_3/A_0$, i.e., ratio of cross-sectional area $A_3$ of mixed gas passage 19 to cross-sectional area $A_0$ of throat 18; pressure $P_1$ of compressed air flow at upstream end of air passage 17; pressure $P_2$ of ozone flow in ozone passage 20; pressure $P_3$ of air-ozone mixed flow at downstream end of mixed gas passage 19; and Mach number M of air-ozone mixed flow at downstream end of mixed gas passage 19.

TABLE 1

| Area ratio $A_3/A_0$ | Pressure of compressed air flow $P_1$ | Pressure of ozone flow $P_3$ | Pressure of mixed flow $P_3$ | Mach number M |
|---|---|---|---|---|
| 4.4 | 4 | 0.75 | 1.5 | 3.0 |
| 3.4 | 4 | 0.55 | 1.5 | 2.2 |
| 2.0 | 4 | 0.45 | 1.5 | 2.2 |

In general, when ozone is continuously discharged from the ozone generator, the discharge pressure is limited to 0.5 $kg/cm^2$ or less due to performance characteristics and other factors of the sealing portion. When water is sprayed through the atomizer nozzles, atomizer discharge pressure of about 1.5 $kg/cm^2$ is required. Therefore, it is desirable to set the cross-sectional area ratio $A_3/A_0$ of the mixed gas passage 19 to about 2.

Figure 3:
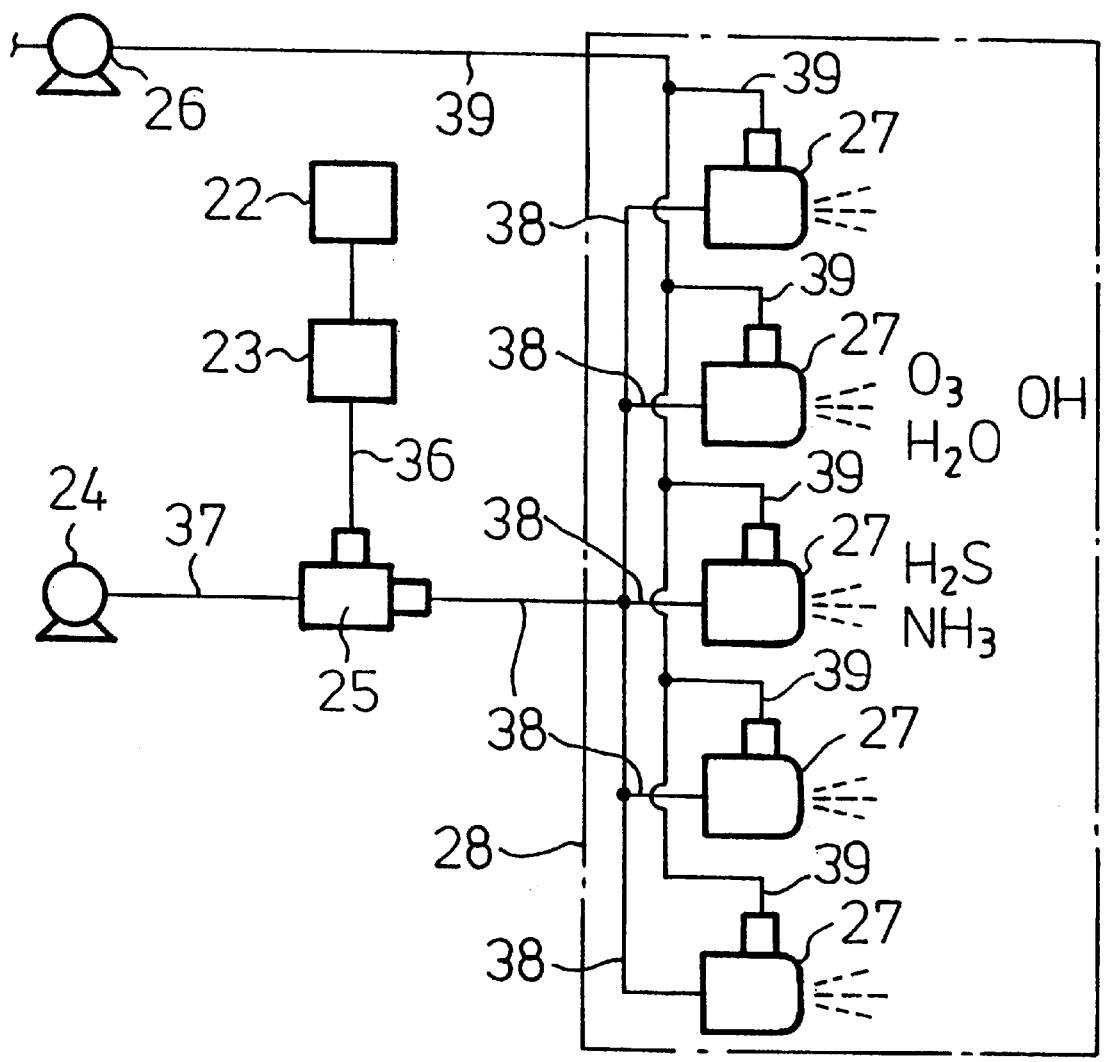
FIG. 3 is a schematic view of an embodiment of an ozone fog generator according to the invention.
Figure 4:
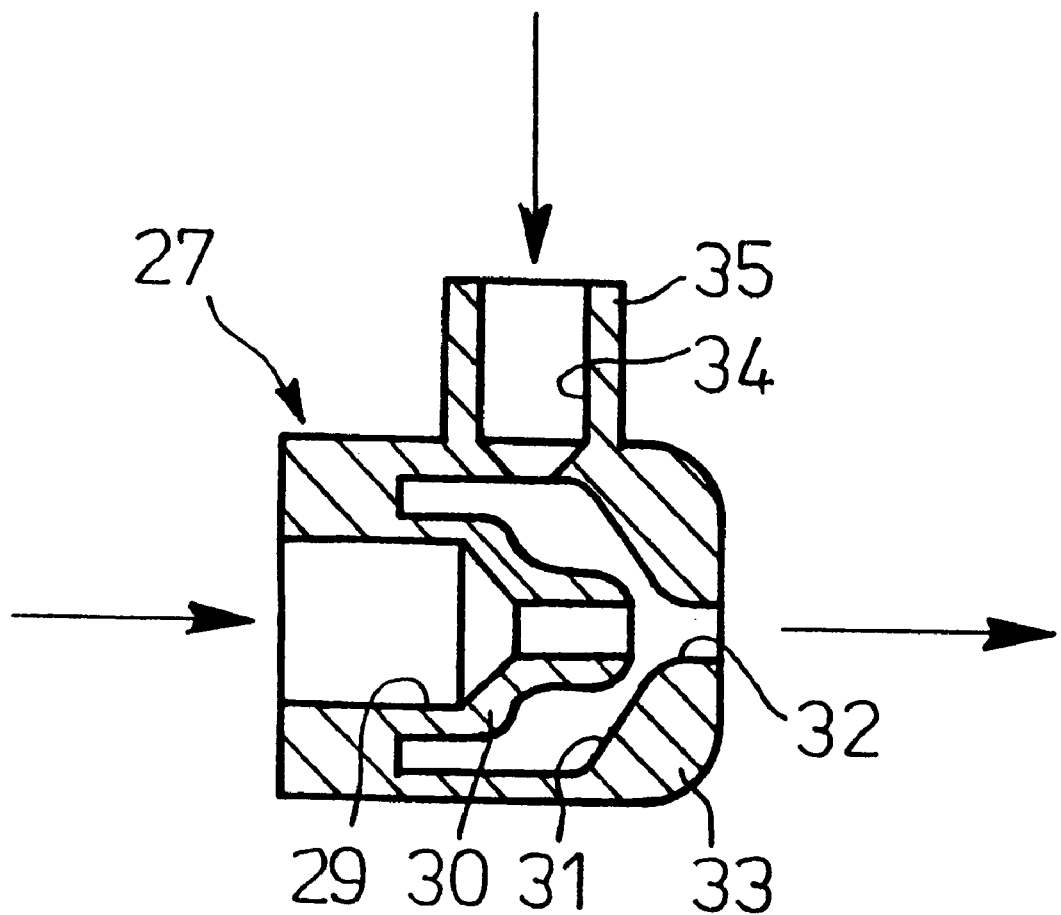
FIG. 4 is a sectional view of an atomizer nozzle shown in FIG. 3.

FIGS. 3 and 4 represent an embodiment of the ozone fog generator of the invention. In the drawings, the air-ozone mixer shown by reference numeral 25 has the same construction as the one shown in FIG. 2.

The ozone fog generator comprises an oxygen generator 22 for extracting oxygen ($O_2$) by increasing and reducing pressure on the air, an ozone generator 23 for generating ozone ($O_3$) from the oxygen from the oxygen generator 22 to discharge ozone flow, an air compressor 24 for compressing the air to discharge compressed air flow, an air-ozone mixer 25 for mixing the compressed air flow from the air compressor 24 with the ozone flow from the ozone generator 23 to discharge the air-ozone mixed flow, a water feed pump 26 for sucking and discharging water stored in a water storage tank (not shown) and a plurality of atomizer nozzles (two-fluid nozzles) for mixedly spraying the air-ozone mixed flow from the air-ozone mixer 25 and water from the water feed pump 26.

The above-mentioned oxygen generator 22, ozone generator 23, air compressor 24, air-ozone mixer 25 and water feed pump 26 are arranged outside the waste water treatment vessel 28. The atomizer nozzles 27 are disposed upwardly within the waste water treatment vessel 28.

Each of the atomizer nozzles 27, as shown in FIG. 4, comprises a gas communicating section 30 having a gas passage 29, a vortex-chamber forming section 33 integral with the section 30 to provide a vortex chamber 31 around an outer peripheral surface on a downstream end of the section 30 and having a spray outlet 32 on a portion closer to its downstream end and a fluid communicating section 35 integral with the section 33 and having a fluid passage 34 communicated with the vortex chamber 31.

The ozone generator 23 has an ozone discharge port to which the ozone passage 20 (FIG. 2) of the air-ozone mixer 25 is connected via an ozone feed pipe 36. The air compressor 24 has a compressed air discharge port to which the air passage 17 (FIG. 2) of the air-ozone mixer 25 is connected via an air feed pipe 37.

The mixed gas passage 19 (FIG. 2) of the air-ozone mixer 25 is connected with an air passage 29 (FIG. 4) of each of the atomizer nozzles 27 via an air-ozone feed pipe 38. A water discharge port of the water feed pump 26 is connected with a fluid passage 34 (FIG. 4) of each of the atomizer nozzles 27 via a water feed pipe 39.

The ozone generator 23 may be a generator to generate ozone by silent discharge to oxygen, a generator to generate ozone by creeping discharge to oxygen or a generator to generate ozone by ultraviolet ray irradiation.

Next, mode of operation of the ozone fog generator shown in FIGS. 3 and 4 will be described.

Upon purification process of the waste water in the waste water treatment vessel 28, the oxygen generator 22, ozone generator 23, air compressor 24 and water feed pump 26 are operated so as to remove smell components such as hydrogen sulfide ($H_2S$) or ammonia ($NH_3$) emitted from the waste water inside the vessel 28.

The ozone generator 23 generates ozone from the oxygen extracted by the oxygen generator 22 and discharges ozone flow under pressure of about 0.5 kg/cm$^2$, and the air compressor 24 compresses the air and discharges the compressed air under pressure of about 4 kg/cm$^2$. The water feed pump 26 sucks water from the water storage vessel and discharges the water flow.

The compressed air discharged from the air compressor 24 flows into the air passage 17 (FIG. 2) of the air-ozone mixer 25 via the air feed pipe 37, and the ozone discharged from the ozone generator 23 flows into the ozone passage 20 (FIG. 2) of the air-ozone mixer 25 via the ozone feed pipe 36. As already described, the air-ozone mixed flow under pressure of about 1.5 kg/cm$^2$ is discharged from the mixed gas passage 19 (FIG. 2) of the air-ozone mixer 25.

The air-ozone mixed flow enters via the air-ozone feed pipe 38 into the gas passage 29 of the atomizer nozzle 27, and the water from the water feed pump 26 enters into the fluid passage 34 of the atomizer nozzle 27. To the water flow flowing from the fluid passage 34 into the vortex chamber 31 to thereby have swirling force, the air-ozone mixed flow from the gas passage 29 is sprayed. Ozone fog mixedly containing ozone and fine water particles is sprayed into the waste water treatment vessel 28 through the spray outlet 32 of each of the atomizer nozzles 27 to cover waste water surface in the waste water treatment vessel 28.

In this case, ozone contacts water in the vortex chamber 31 of the atomizer nozzle 27 to generate hydroxyl radicals (OH radicals) with high activity. The ozone and water molecules of fine water particles sprayed from the atomizer nozzle 27 and floating in the waste water treatment vessel 28 react with each other to continuously generate hydroxyl radicals. The hydroxyl radicals thus generated and ozone contained in the ozone fog oxidize hydrogen sulfide, ammonia and the like emitted from waste water to be treated in the vessel 28, and ammonia and the like are dissolved in the fine water particles contained in the ozone fog and are dropped to the vessel 28, thereby effecting deodorization of the waste water treatment vessel 28.

The above-mentioned hydroxyl radicals have high activity so that oxidizing rate of smell components by the hydroxyl radicals is higher than the oxidizing rate of the smell components by ozone. Moreover, the ozone serves as starting material to generate hydroxyl radicals. Accordingly, smell components and unreacted ozone are not contained in the air discharged from the waste water treatment vessel 28 to outside, and diffusion of offensive smell to outside of the waste water treatment vessel 28 is prevented.

It is to be understood that the air-ozone mixer and the ozone fog generator of the invention are not limited to the above embodiments and that various changes and modifications may be made without departing from the spirit and the scope of the invention. For example, an ozone generator to generate ozone by electrolysis of water may be used instead of the oxygen generator. City water pipe may be connected to the water supply pipe via a stop valve instead of using the pump.

Industrial Applicability

Compressed air flow under high pressure and ozone flow under low pressure are mixedly discharged without extensively reducing the pressure of the mixed flow to ensure spraying pressure at the atomizer nozzles for mixing ozone and water. Hydroxyl radicals with high activity are generated from ozone and water molecules of fine water particles mixedly sprayed through the atomizer nozzles, and are suitably used for deodorization.

What is claimed is:

1. An air-ozone mixer, comprising an air passage extending from one end surface of a body toward the other end of the body and having a cross-sectional area gradually reduced toward downstream portion thereof, a throat extending from a downstream end of the air passage toward the other end of the body and having a cross-sectional area substantially equal to that of the downstream end of the air passage, a mixed gas passage having overall length longer than that of the air passage and throat, extending from the downstream end of the throat to the other end of the body and having a cross-sectional area slightly larger than that of the throat, an ozone passage extending from an outer lateral side surface of the body toward a portion near an upstream end of the mixed gas passage, and an ozone injection port for communicating a downstream end of the ozone passage with the portion near the upstream end of the mixed gas passage, whereby said air passage, said throat and said mixed gas passage are coaxially arranged.

2. An air-ozone mixer according to claim 1, wherein a ratio of the cross-sectional area of the mixed gas passage to that of the throat is set to about 2.

3. An ozone fog generator, having an air-ozone mixer, said air-ozone mixer comprising an air passage extending from one end surface of a body toward the other end of the body and having a cross-sectional area gradually reduced toward downstream portion thereof, a throat extending from a downstream end of the air passage toward the other end of the body and having a cross-sectional area substantially equal to that of the downstream end of the air passage, a mixed gas passage having overall length longer than that of the air passage and throat, extending from the downstream end of the throat to the other end of the body and having a cross-sectional area slightly larger than that of the throat, an ozone passage extending from an outer lateral side surface of the body toward a portion near an upstream end of the mixed gas passage, and an ozone injection port for communicating a downstream end of the ozone passage with the portion near the upstream end of the mixed gas passage, whereby said air passage, said throat and said mixed gas passage are coaxially arranged, the air passage of the air-ozone mixer being connected with an air compressor for discharging compressed air flow, the ozone passage of the air-ozone mixer being connected with an ozone generator for discharging ozone flow, the mixed gas passage of the air-ozone mixer and water supplying means being connected with atomizer nozzles for mixedly spraying the gas and the water.

* * * * *